(No Model.)
C. R. HOWARD.
BICYCLE ATTACHMENT.
No. 568,406.      Patented Sept. 29, 1896.
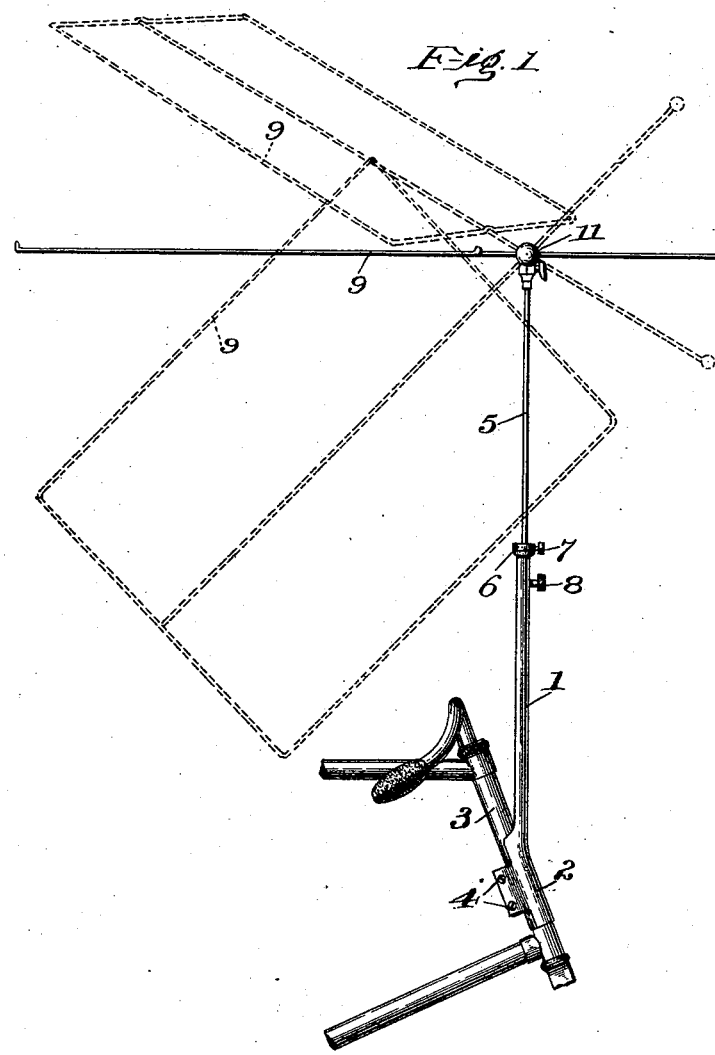
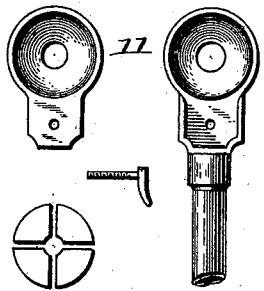
Witnesses
Theo. L. Gatchel.
J. G. Tabler.
Inventor
Charles R. Howard
By John Wedderburn
his Attorney.

UNITED STATES PATENT OFFICE.

CHARLES R. HOWARD, OF SOMERVILLE, NEW JERSEY.

BICYCLE ATTACHMENT.

SPECIFICATION forming part of Letters Patent No. 568,406, dated September 29, 1896.

Application filed April 10, 1896. Serial No. 587,039. (No model.)

*To all whom it may concern:*

Be it known that I, CHARLES R. HOWARD, a citizen of the United States, residing at Somerville, in the county of Somerset and State of New Jersey, have invented certain new and useful Improvements in Bicycle Attachments; and I do hereby declare that the following is a full, clear, and exact description of the invention, such as will enable others skilled in the art to which it appertains to make and use the same.

My invention relates to bicycle attachments, the object of the same being to provide a simple and cheap head-shade for bicycles, which may be readily attached to a machine of any make and is capable of universal adjustment.

The invention consists of a hollow standard having a sleeve or collar upon the lower end thereof, which is adapted to embrace the front bar of the bicycle-frame and to be secured thereto by means of a suitable thumb-screw, a telescoping rod fitting within said hollow standard and having an adjustable collar thereon for supporting it at any desired elevation, a set-screw in said standard engaging said rod, and a head-shade consisting of a metallic frame attached to the upper end of said telescoping rod by a ball-and-socket joint and capable of being adjusted to any desired angle.

The invention also consists in other details of construction and combinations of parts which will be hereinafter more fully described and claimed.

In the drawings forming a part of this specification, Figure 1 represents a perspective view of my device shown attached to a bicycle, with the head-shade shown in full lines in one position and in dotted lines in two other positions. Fig. 2 is a view showing the construction of the ball-and-socket joint between the telescoping rod and the shade supporting the rod.

Like reference-numerals indicate like parts in the different views.

The hollow standard 1 has a sleeve or collar 2, formed upon the lower end thereof, which is adapted to embrace the front bar 3 of the bicycle-frame and to be moved up or down thereon and adjusted to any desired point by means of set-screws 4. Fitting within the hollow standard 1, and capable of rotation therein, is a telescoping rod 5, having an adjustable collar 6 thereon, with a set-screw 7 passing through it and engaging the said rod. A similar set-screw 8 passes through the standard 1 and is adapted to engage the telescoping rod 5 for the purpose of preventing the rotation thereof. The head-shade 9 is made up of a metallic frame, preferably covered with opaque waterproof material, with a narrow fringe extending down from the outer edges thereof. The supporting-rod 10 of said shade is connected to the upper end of the telescoping rod 5 by a ball-and-socket joint 11, with means provided for adjusting said shade at any desired angle.

In applying my device the standard 1 is attached to the frame of the bicycle in the manner described and the telescoping rod moved up or down by loosening the set-screw 8 until the desired elevation has been reached. The collar 6 is then moved to the proper point on said rod, so that the lower edge thereof will bear against the upper end of the standard 1. It is then locked in position by the set-screw 7. The rod 5 is then turned to the right or the left in its socket and adjusted at any point by means of the set-screw 8. By reason of the ball-and-socket connection between the shade-supporting rod 10 and the upper end of the rod 5 said shade is adapted to be turned to any desired angle and to be locked in adjusted position. In this way a shade attachment for bicycles is provided, which is capable of universal adjustment and adapted to be connected to a bicycle of any construction.

Having now described my invention, what I claim as new, and desire to secure by Letters Patent, is—

The combination with a bicycle, of a head-shade attachment therefor consisting of a hollow standard having a sleeve or collar upon its lower end which is adapted to embrace the front bar of the bicycle-frame, a telescoping rod fitting within said standard, a set-screw passing through said standard and engaging said rod, an adjustable collar on said rod, and a head-shade proper whose supporting-rod is connected to said telescoping rod by a ball-and-socket joint, substantially as and for the purpose described.

In testimony that I claim the foregoing as my own I have hereunto affixed my signature in presence of two witnesses.

CHARLES R. HOWARD.

Witnesses:
JAMES L. GRIGGS,
W. C. SANBORN.